(12) United States Patent
Tuttlebee

(10) Patent No.: US 6,280,331 B1
(45) Date of Patent: Aug. 28, 2001

(54) TORQUE LIMITING SLIP CLUTCH APPARATUS FOR CABLE REEL DRIVE ASSEMBLY

(75) Inventor: Roger Tuttlebee, Peterborough (GB)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/251,140

(22) Filed: Feb. 16, 1999

(51) Int. Cl.[7] .................................................... F16D 7/02
(52) U.S. Cl. ............................................................. 464/46
(58) Field of Search ................................ 464/43, 44, 45, 464/46, 47, 48; 192/111 B

(56) References Cited

U.S. PATENT DOCUMENTS

| | | | |
|---|---|---|---|
| 1,231,638 | * | 7/1917 | Nikonow ........................... 464/46 X |
| 1,235,940 | * | 8/1917 | Shipman ............................ 464/44 X |
| 2,123,744 | * | 7/1938 | Ramsey ................................. 464/48 |
| 2,659,220 | * | 11/1953 | Cherry .................................. 464/46 |
| 2,729,078 | * | 1/1956 | Schmidt ................................ 464/47 |
| 2,753,703 | * | 7/1956 | McIntyre ........................... 464/46 X |
| 3,092,983 | * | 6/1963 | Huber .................................... 464/46 |
| 3,319,751 | * | 5/1967 | Sacchini ............................. 464/46 X |
| 3,457,733 | * | 7/1969 | Bangerter et al. ................. 464/46 X |
| 3,467,260 | * | 9/1969 | Thompson ......................... 464/46 X |
| 3,681,940 | * | 8/1972 | Albrile .............................. 464/46 X |
| 4,095,685 | * | 6/1978 | McDonald et al. ................ 464/46 X |
| 5,551,917 | * | 9/1996 | Wood .................................... 464/46 |

* cited by examiner

Primary Examiner—Lynne H. Browne
Assistant Examiner—Greg Binda
(74) Attorney, Agent, or Firm—Michael R. Swartz

(57) ABSTRACT

A torque limiting slip clutch apparatus for a cable reel drive assembly includes an elongated input drive shaft, annular rotary drive member, annular drive plate, friction generating disc element and biasing force generating spring mechanism. The drive shaft is mounted to undergo rotational movement. The drive member is mounted about the shaft to undergo rotational movement relative to the drive shaft and translational movement along the shaft. The drive plate is fixedly mounted about the drive shaft adjacent to the drive member to undergo rotational movement with the shaft and relative to the drive member. The disc element is mounted between and engagable with the drive member and drive plate to generate friction therebetween that causes rotational movement of the drive member with the drive plate and drive shaft in response to translational movement of the drive member along the shaft toward the drive plate. The spring mechanism is mounted along the drive shaft adjacent to a side of the drive member opposite from the drive plate to generate a biasing force against the drive member causing translational movement of the drive member toward the drive plate and generation of friction between the drive member and drive plate.

4 Claims, 6 Drawing Sheets

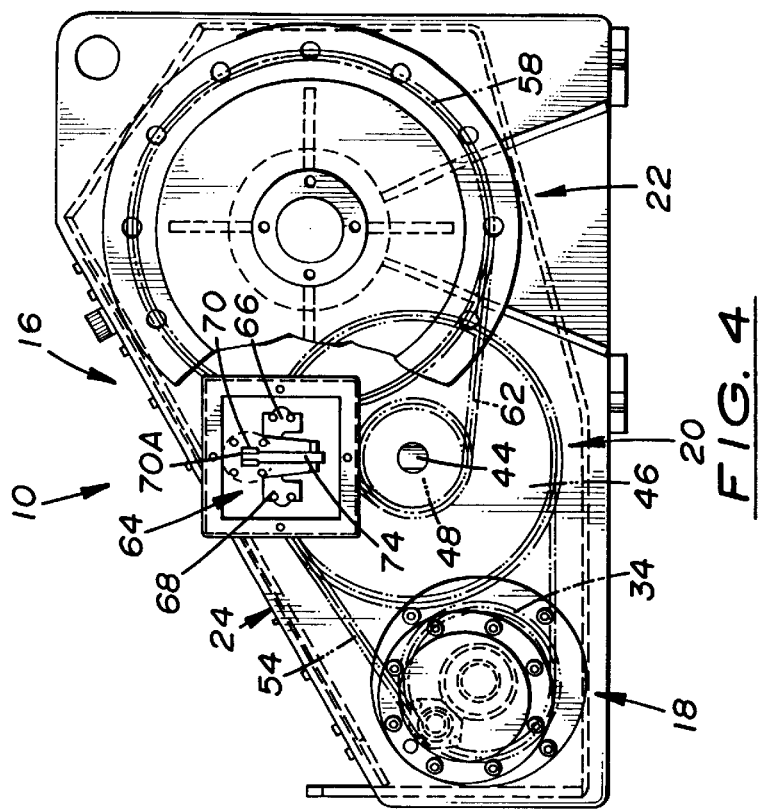
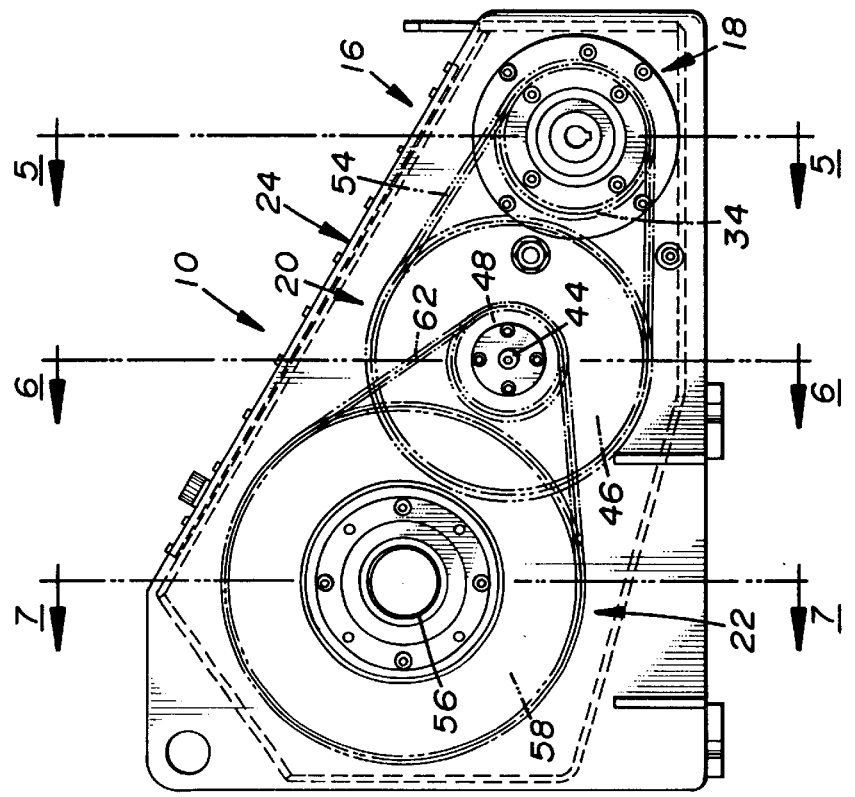
FIG. 4
FIG. 3

TORQUE LIMITING SLIP CLUTCH APPARATUS FOR CABLE REEL DRIVE ASSEMBLY

BACKGROUND OF THE INVENTION

1. Field of the Invention

The present invention generally relates to a cable reel drive assembly and, more particularly, is concerned with a torque limiting slip clutch apparatus and a cable reel drive assembly employing the slip clutch apparatus.

2. Description of the Prior Art

Motor-driven constant-torque reel drive assemblies are used in various industrial applications where cables and hoses of varying lengths reeled out from a stationary source of supply are needed to provide power and control to machinery and equipment that move relative to the stationary supply source. As used hereafter, the term "cable" is meant to include within the scope of its definition electrical cables, hydraulic hoses and the like.

Well-known examples of where such reel drive assemblies are used are levelwind and monospiral cable reels commercially available from Gleason Reel Corp. of Mayville, Wis., a subsidiary of Hubbell Corporation. The levelwind and monospiral cable reels are used in conjunction with the operation of container and raw material handling cranes for unloading ships. The levelwind cable reel stores cable in, and thus pays out cable from, a side-by-side single-layer configuration of cable on the reel. The monospiral reel stores cable in, and thus pays out cable from, a single multiple-layer configuration of cable on the reel.

There are various factors which can adversely affect the operational efficiency of a cable reel drive assembly. These factors include different rotation speed and output torque requirements during cable payout as opposed to cable rewind and the inertia effects of various components on cable tension during cable payout in response to machinery accelerations. Consequently, a need still remains for innovations to a cable reel drive assembly which will give due consideration to these factors and thereby reduce their adverse impact on operational efficiency of the cable reel drive assembly.

SUMMARY OF THE INVENTION

The present invention provides a torque limiting slip clutch apparatus and a cable reel drive assembly employing the slip clutch apparatus designed to satisfy the aforementioned need. The slip clutch apparatus of the present invention accommodates the different rotational speed and output torque requirements during cable payout as opposed to cable rewind when the operation of a drive motor is not needed and thus shutoff during cable payout. The shutoff of the drive motor operation enables the slip clutch to function as a slip brake restraining the rotation of a cable supply spool to the speed at which the cable is pulled from the spool by the movement of machinery connected to the cable and to function as a holding brake preventing further rotation of the cable supply spool when movement of the machinery has ceased. The slip clutch apparatus of the present invention also isolates and prevents any torque forces (referred inertia) required to accelerate components of the drive assembly from reaching the cable supply spool and cable thereon so that such torque forces are not translated as tension in the cable. By reducing cable tension the spoke size of the cable supply spool can be reduced which, in turn, lowers spool inertia requiring a lower drive torque (or rotary force) to rotate the spool. The lower torque drive, in turn, means even lower cable tension. The combined effect of these reductions is to increase the overall efficiency of the cable reel drive assembly.

Accordingly, the present invention is directed to a torque limiting slip clutch apparatus for use in a cable reel drive assembly. The slip clutch apparatus comprises: (a) an elongated drive shaft mounted to undergo rotational movement; (b) an annular rotary drive member mounted about the drive shaft to undergo rotational movement relative to the drive shaft and translational movement along the drive shaft; (c) an annular drive plate fixed mounted about the drive shaft adjacent to the rotary drive member to undergo rotational movement with the drive shaft and relative to the rotary drive member; (d) means mounted between and engagable with the rotary drive member and drive plate for generating friction therebetween that reduces the rotational movement of the drive plate and drive shaft relative to the rotary drive member in response to translational movement of the rotary drive member along the drive shaft toward the drive plate; and (e) means mounted along the drive shaft adjacent to a side of the rotary drive member opposite from the drive plate for generating a biasing force against the rotary drive member to cause translational movement of the rotary drive member along the drive shaft toward the drive plate and generation of friction between the rotary drive member and drive plate. The slip clutch apparatus further comprises a torque adjustment mechanism disposed adjacent to the biasing force generating means and being operable to adjust the size of the biasing force generated by the biasing force generating means.

The present invention also is directed to a cable reel drive assembly which comprises: (a) a rotary power source operable to provide rotary drive motion at a predetermined input speed; (b) a cable supply spool storing a cable and being rotatable to payout and rewind the cable; and (c) a speed reducer unit disposed between and drivingly connecting the rotary power source to the cable supply spool. The speed reducer unit is operable in cable payout and rewind rotation modes to cause the cable supply spool to correspondingly payout and rewind the cable. The speed reducer unit includes a first speed reduction stage having an input drive shaft and a torque limiting slip clutch. The input drive shaft is drivingly coupled to the rotary power source and mounted to undergo rotational movement in response to the rotary drive motion provided at the predetermined input speed by the rotary power source. The slip clutch is drivingly coupled to the input drive shaft to undergo rotational movement therewith and operable to receive the rotary drive motion at the input speed from the input drive shaft and to reduce the rotary drive motion to and provide the rotary drive motion as output at a first speed less than the input speed.

The speed reducer unit also includes a second speed reduction stage and a third speed reduction stage. The second speed reduction stage is drivingly coupled to the slip clutch of the first speed reduction stage and operable to receive the rotary drive motion at the first speed from the first speed reduction stage and to reduce the rotary drive motion to and provide the rotary drive motion as output at a second speed less than the first speed. The third speed reduction stage is rotatable to cause the cable supply spool to payout and rewind the cable and is drivingly coupled to the second speed reduction stage to receive the rotary drive motion at the second speed from the second speed reduction stage and to reduce the rotary drive motion to and provide the rotary drive motion at a third speed less than the second speed and thereby rotate the cable supply spool to correspondingly payout and rewind cable at the third speed. The second speed reduction stage also includes means for sensing in which of the cable payout and rewind rotational modes the speed reducer unit is operating at any given time to cause shutoff of operation of the rotary power source in response to sensing the cable payout rotational mode but not the cable rewind rotational mode to thereby enable the slip clutch to function as a slip brake restraining the rotation of the cable supply spool to the speed at which the cable is pulled from the cable supply spool by movement of machinery connected to the cable and to function as a holding brake preventing further rotation of the cable supply spool when movement of the machinery has ceased.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 3 is a left side elevational view of a speed reducer unit of the drive assembly as seen along line 3—3 of FIG. 1.

FIG. 4 is a right side elevational view of the speed reducer unit of the drive assembly as seen along line 4—4 of FIG. 1.

DETAILED DESCRIPTION OF THE INVENTION

Figure 2:
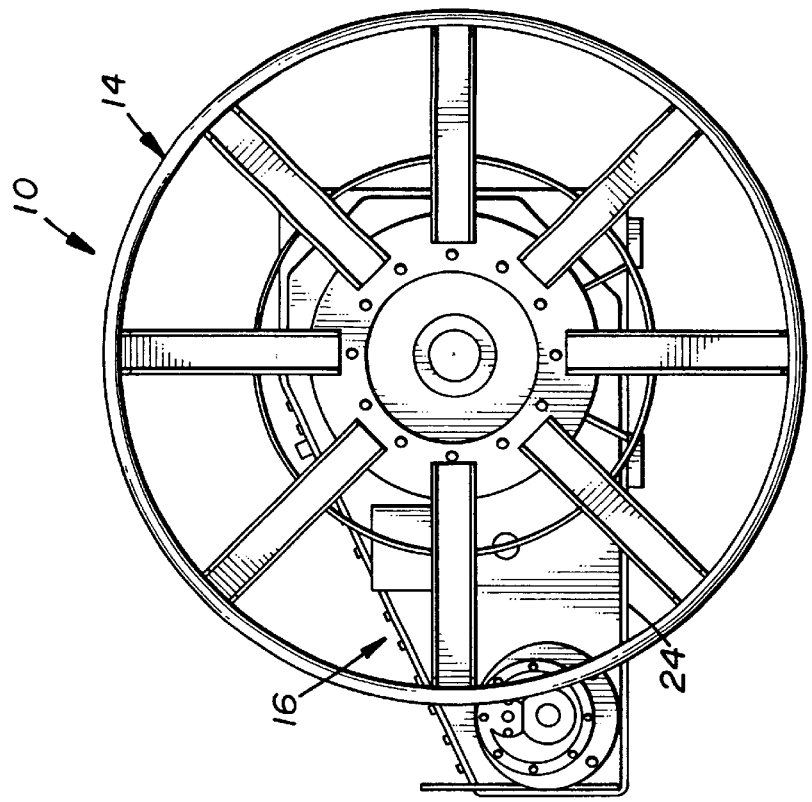
FIG. 2 is an end elevational view of the drive assembly as seen along line 2—2 of FIG. 1.
Figure 1:
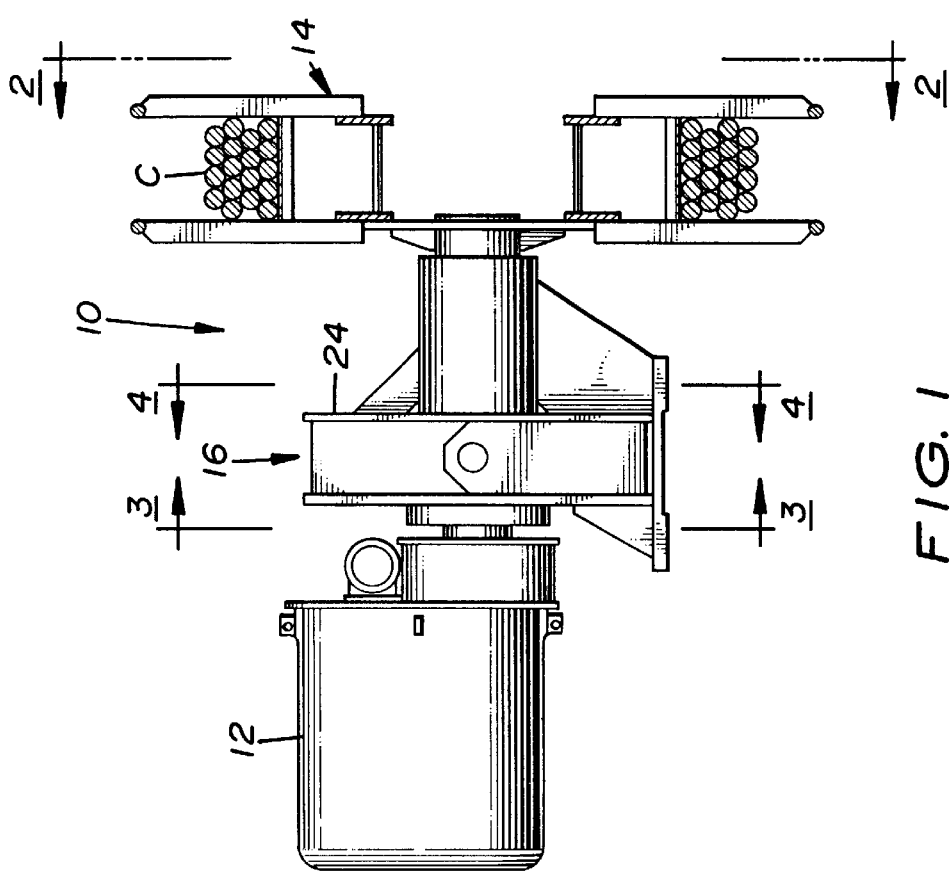
FIG. 1 is a side elevational view of a cable reel drive assembly of the present invention employing a torque limiting slip clutch of the present invention.

Referring to the drawings and particularly to FIGS. 1 to 5, there is illustrated a cable reel drive assembly of the present invention, generally designated 10. The cable reel drive assembly 10 basically includes a rotary power source 12 operable to provide rotary drive motion (or drive torque) at a predetermined input speed, a cable supply spool 14 storing a cable C and being rotatable to payout and rewind the cable C, and a speed reducer unit 16 disposed between the power source 12 and cable supply spool 14 and drivingly connecting the power source 12 to the cable supply spool 14. The speed reducer unit 16 is operable in cable payout and rewind rotation modes to cause the cable supply spool 14 to correspondingly payout and rewind the cable C at a desired speed less than the input speed. In the illustrated embodiment, the rotary power source is in the form of an electric motor coupled to a speed reducing gearbox and which have been collectively referred to by the reference numeral 12.

More particularly, the speed reducer unit 16 includes a first (or primary) speed reduction stage 18, a second (or secondary) speed reduction stage 20, a third (or tertiary) speed reduction stage 22, and an enclosure or housing 24 structurally supporting and enclosing the first, second and third speed reduction stages 18, 20, 22 in an oil bath coolant and also supporting the weight of the power source 12 and the cable supply spool 14. The first speed reduction stage 18 of the speed reducer unit 16 is drivingly coupled to the power source 12 and is operable to receive the rotary drive motion at the desired predetermined input speed from the power source 12 and to reduce the rotary drive motion to and provide as output the rotary drive motion at a first speed less than the predetermined input speed. The second speed reduction stage 20 of the speed reducer unit 16 is drivingly coupled to the first speed reduction stage 18 and is operable to receive the rotary drive motion at the first speed from the first speed reduction stage 18 and to reduce the rotary drive motion to and provide as output the rotary drive motion at a second speed less than the first speed. The third speed reduction stage 22 of the speed reducer unit 16 is drivingly coupled to the second speed reduction stage 20 and is operable to receive the rotary drive motion at the second speed from the second speed reduction stage 20 and to reduce the rotary drive motion to and provide the rotary drive motion to drive the cable supply spool 14 at a third speed less than the second speed. The second speed reduction stage 22 also can sense in which of cable payout and rewind rotational modes the speed reducer unit 16 is operating at any given time so as to shutoff operation of the power source 12 only during the cable payout rotational mode.

Figure 5:
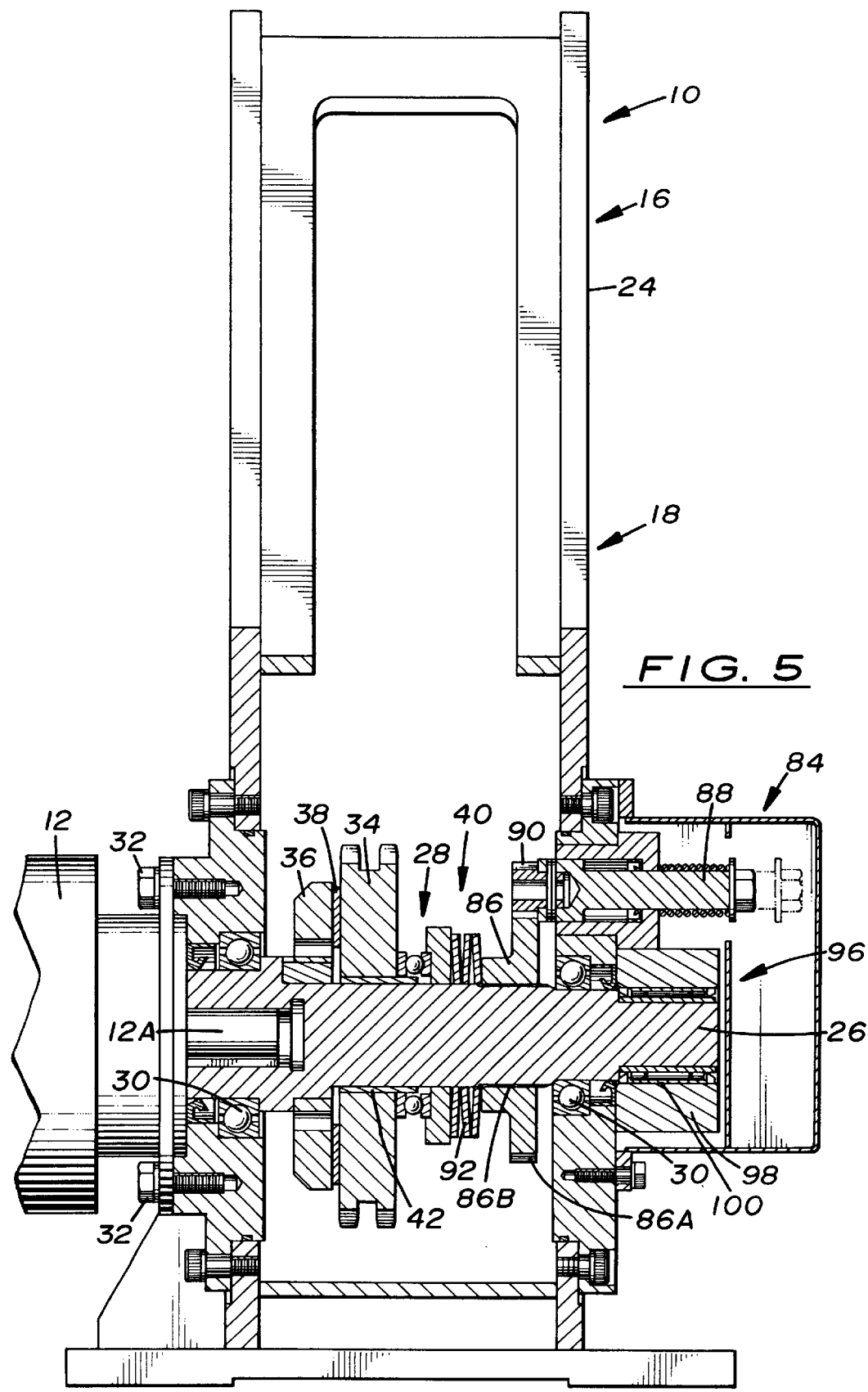
FIG. 5 is an axial sectional view of a first speed reduction stage of the drive assembly taken along line 5—5 of FIG. 3, showing a first embodiment of the components of the slip clutch of the present invention.

Referring to FIGS. 3 to 5, the first speed reduction stage 18 of the speed reducer unit 16 includes an input drive shaft 26 and a torque limiting slip clutch 28 also of the present invention. The input drive shaft 26 of the first speed reduction stage 18 is rotatably mounted at its opposite ends by a pair of bearings 30 to the housing 24 and is drivingly coupled to a rotary output shaft 12A of the power source 12 supported at an external side of the housing 24 by bolts 32. The input drive shaft 26 thereby will undergo rotational movement relative to the housing 24 in response to the rotary drive motion (or drive torque) provided by the power source 12 at the desired predetermined input speed.

The torque limiting slip clutch 28 of the first speed reduction stage 18 includes an annular rotary drive member 34, an annular drive plate 36, a disc element 38 having a suitable friction generating material, such as a carbon fiber woven fabric or sintered bronze, affixed thereon, and a biasing force generating spring mechanism 40. The rotary drive member 34 of the slip clutch 28 preferably is a sprocket mounted about the input drive shaft 26 to undergo rotational movement relative to the input drive shaft 26 and translational movement along the input drive shaft 26 over the axial length of a bushing 42 which rotatably and slidably mounts the rotary drive member 34 on the input drive shaft 26. The annular drive plate 36 of the slip clutch 28 is fixedly mounted to and about the input drive shaft 26 adjacent to the rotary drive member 34 to undergo rotational movement with the input drive shaft 26 and relative to the rotary drive member 34. The friction generating disc element 38 of the slip clutch 28 is mounted between the rotary drive member 34 and the drive plate 36 and attached to the drive plate 36 and thereby adapted to engage the rotary drive member 34 to generate friction between the disc element 38 and the rotary drive member 34 that causes rotational movement of the rotary drive member 34 with the input drive shaft 26 and drive plate 36 in response to translational movement of the rotary drive member 34 along the input drive shaft 26 toward the drive plate 36. The spring mechanism 40 of the slip clutch 28 is mounted along the input drive shaft 26 adjacent to a side of the rotary drive member 34 opposite from the drive plate 36 to generate a biasing force against the rotary drive member 34 causing translational movement of the rotary drive member 34 toward the drive plate 36 and generation of friction between the rotary drive member 34 and drive plate 36. The first speed reduction stage 18 is thereby coupled to the input drive shaft 26 to undergo rotational movement therewith to reduce the rotary drive motion to a first speed less than the predetermined input speed and provide as output the rotary drive motion at the first speed by the rotary drive member 34. The rotary motion or torque transmitted to the rotary drive member 34 of the slip clutch 28 is dependent upon available drive torque of the power source 12, friction coefficient of the friction generating material, lubricating effect of the oil bath coolant, and biasing force generated from the compression of the spring mechanism 40.

Figure 6:
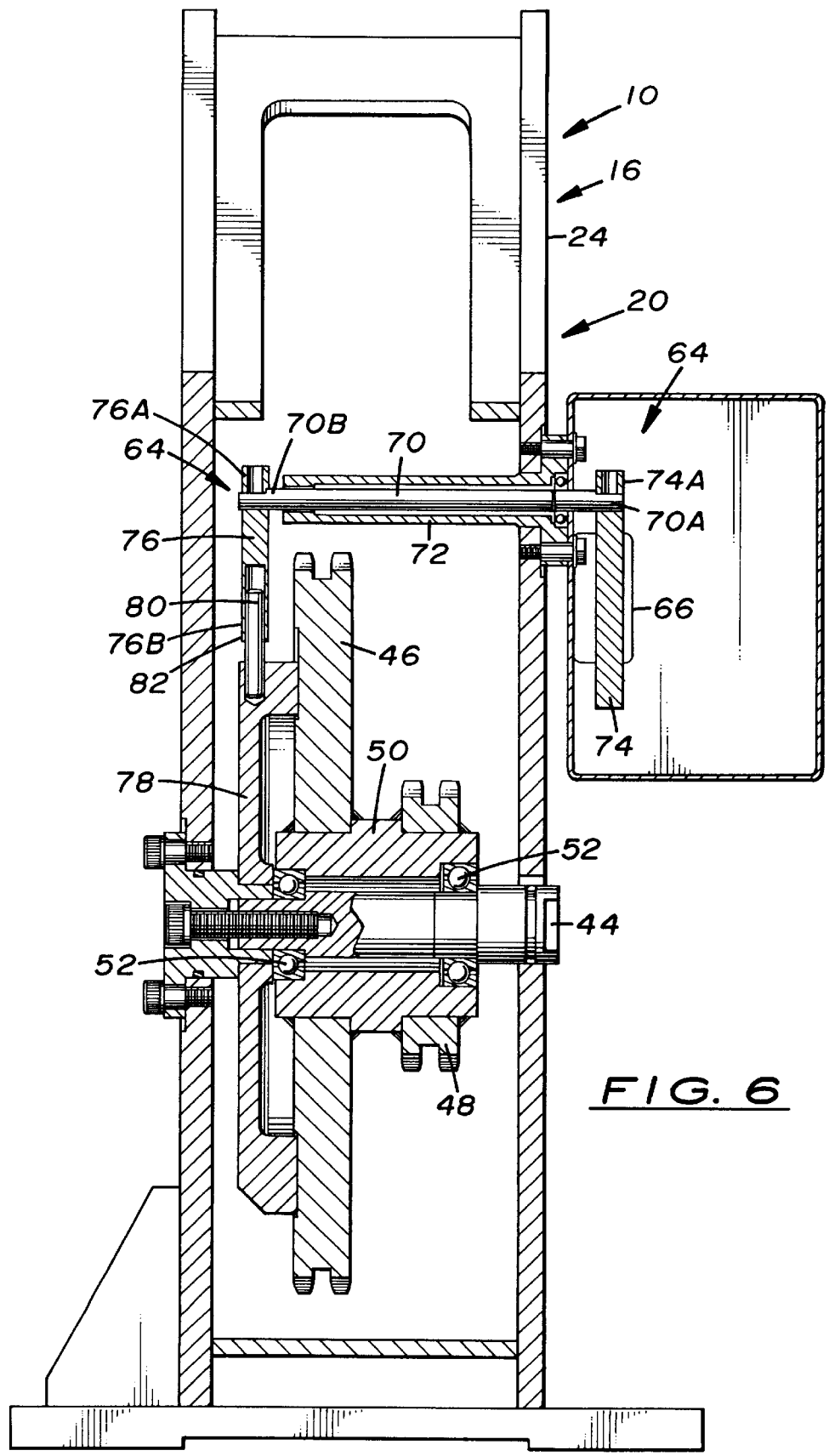
FIG. 6 is an axial sectional view of a second speed reduction stage of the drive assembly taken along line 6—6 of FIG. 3, showing the components for sensing in which of cable payout and rewind modes the speed reducer unit of the drive assembly is operating at any given time.

Referring to FIGS. 3, 4 and 6, the second speed reduction stage 20 of the speed reducer unit 16 includes an intermediate shaft 44, and first and second rotary members 46, 48. The intermediate shaft 44 of the second speed reduction stage 20 is stationarily mounted at its opposite ends to the housing 24. The first and second rotary members 46, 48 are preferably sprockets and are mounted adjacent to and connected with one another by an annular collar 50. The annular collar 50 is rotatably mounted about the intermediate shaft 44 by a pair of bearings 52 disposed at opposite ends of the annular collar 50 so that the annular collar 50 and the first and second rotary members 46, 48 therewith can undergo rotational movement together relative to the intermediate shaft 44. The first rotary member 46 is larger in diameter than the rotary drive member 34 of the slip clutch 28 of the first speed reduction stage 18 and larger in diameter than the second rotary member 48. The first rotary member 46 is drivingly coupled by an endless drive chain 54 to the rotary drive member 34 of the slip clutch 28 such that the rotary drive motion transmitted at the first speed from the rotary drive member 34 to the first rotary member 46 is reduced by the first rotary member 46 to a second speed less than the first speed and is provided as output at the second speed by the second rotary member 48.

Figure 7:
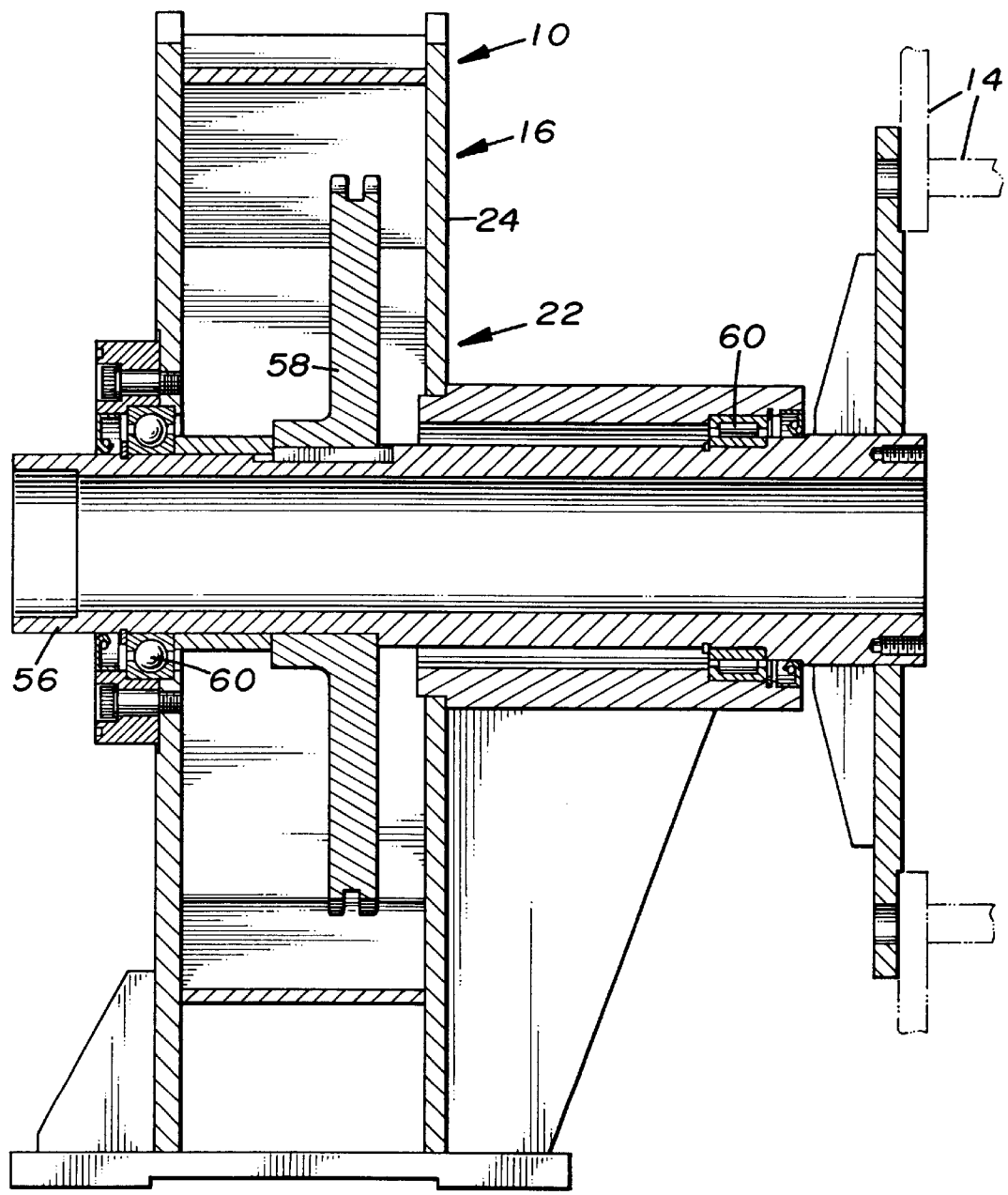
FIG. 7 is an axial sectional view of a third speed reduction stage of the drive assembly taken along line 7—7 of FIG. 3, showing the components for storage and payout of cable.

Referring to FIGS. 3, 4 and 7, the third speed reduction stage 22 of the speed reducer unit 16 includes an output shaft 56, a rotary driven member 58 and the cable supply spool 14. The output shaft 56 of the third speed reduction stage 22 is rotatably mounted to the housing 24 by a pair of bearings 60 disposed adjacent to opposite ends of the output shaft 56 such that the output shaft 56 can undergo rotational movement relative to the housing 24. The rotary driven member 58 of the third speed reduction stage 22 is fixedly mounted to and about the output shaft 56 to undergo rotational movement therewith. The cable supply spool 14 is axially spaced from the rotary driven member 58 and fixedly mounted to and about the output shaft 56 to undergo rotational movement therewith to either payout of cable C from the cable supply spool 14 or rewind of cable C onto the cable supply spool 14. The rotary driven member 58 is a sprocket larger in diameter than the second rotary member 48 of the second speed reduction stage 20 and is drivingly coupled by an endless drive chain 62 to the second rotary member 48 of the second speed reduction stage 22 such that the rotary drive motion transmitted at the second speed from the second rotary member 48 to the rotary driven member 58 is reduced to a third speed less than the second speed and is provided as output by the rotation of the output shaft 56 and cable supply spool 14. The output shaft 56 is hollow so as to allow passage of an end portion of the cable (not shown) from the cable supply spool 14 to a slip ring assembly (not shown) located at an opposite side of the housing 24 from the spool 14.

Referring to FIGS. 4 and 6, the second speed reduction stage 20 further includes means, generally designated 64, for sensing in which of the cable payout and rewind rotational modes the speed reducer unit 16 is operating at any given time. Upon sensing operation of the speed reducer unit 16 in the cable payout rotational mode, the sensing means 64 will cause shutoff of operation of the power source 12 and thereby enable the slip clutch 28 to function as a slip brake restraining the rotation of the cable supply spool 14 to the speed at which the cable C is pulled from the cable supply spool 14 by movement of machinery (not shown) connected to the cable C and additionally to function as a holding brake preventing rotation of the cable supply spool 14 when movement of such machinery has ceased. The sensing means 64 does not terminate the operation of the power source 12 during operation of the speed reducer unit 16 in the cable rewind rotational mode.

More particularly, the rotation direction sensing means 64 includes right and left limit switches 66, 68, a horizontal rotatable shaft 70 rotatably mounted by a bushing 72 supported on and extending across the housing 24 above the first and second rotary members 46, 48 disposed therein, and a generally vertical bar 74 disposed between the switches 66, 68 and attached at an upper end 74A to one end 70A of the rotatable shaft 70. The sensing means 64 also includes a vertical inverted Y-shaped member 76 attached at an upper end 76A to the opposite end 70B of the horizontal shaft 70 and extending downwardly therefrom and a rotary disc 78 rotatably mounted about the intermediate shaft 44 in spaced relation from but adjacent to the first rotary member 46 and adapted to rotate in one or the other of opposite directions corresponding to cable payout or rewind rotational modes in response to rotation of the first rotary member 46. The rotation of the first rotary member 46 of the second speed reduction stage 20 causes a corresponding rotational movement of the portion of the oil bath located adjacent to the rotary disc 78 which turns the rotary disc 78 such that a pin 80 mounted thereon between a pair of fingers 82 at a lower end 76B of the vertical inverted Y-shaped member 76 contacts one or the other of the fingers 82 causing rotation of the rotatable shaft 70 in one or the other of opposite rotational directions. Such rotation of the shaft 70, in turn, causes the vertical bar 74 to pivot in the corresponding direction and contact one or the other of the right and left limit switches 66, 68 to either shutoff (de-energize) the electric motor of the power source 12 or otherwise allowing the motor to remain energized depending upon whether the cable C is being pulled off the spool 14 (cable payout) or being rewound onto the spool 14 (cable rewind).

Referring to FIG. 5, the cable reel drive assembly 10 also includes a torque adjustment mechanism, generally designated 84, disposed adjacent to the biasing force generating spring mechanism 40 of the first speed reduction stage 18 of the speed reducer unit 16. The torque adjustment mechanism 84 is operable to adjust the size of the biasing force (or spring load) generated by the spring mechanism 40 so as to provide a means for performing minor adjustments to the output or drive torque of the slip clutch 28 without having to access the drive components inside of the housing 24. More particularly, the torque adjustment mechanism 84 includes an adjustment nut 86 having an outer periphery 86A with gear teeth and an inner periphery 86B with internal threads that threadably mount the adjustment nut 86 about the input drive shaft 26 adjacent to the spring mechanism 40 allowing the adjustment nut 86 to be turned and undergo axial movement along the input drive shaft 26 toward and away from the spring mechanism 40. The torque adjustment mechanism 84 also includes a spring biased rotatable shaft 88 having a pinion gear 90 at one end and being mounted to the housing 24 to undergo reciprocal movement toward and away from the periphery of the adjustment nut 86 so as to move the peripheral gear teeth of the pinion gear 90 into and out of a meshed driving relationship with the gear teeth on the outer periphery 86A of the adjustment nut 86. When meshed, rotation of the shaft 88 and pinion gear 90 therewith causes, depending on the direction of rotation, rotation and axial movement of the adjustment nut 86 along the input drive shaft 26 toward or away from the spring mechanism 40 so as to correspondingly increase or decrease the biasing force generated by the spring mechanism 40 on the rotary drive member 34.

It should also be noted that the speed reducer unit 16 of the cable reel drive assembly 10 is provided with a conventional backstop device 96 for holding the input shaft 26 stationary when the electric motor of the power source 12 is shut off which thereby enables the slip clutch 28 to function as a slip brake as described above. As best seen in FIG. 5, the backstop device 96 (backstop clutch assembly) is mounted on the end of the input shaft 26 and includes a housing 98 surrounding the shaft 26 and a freewheel 100 disposed between the inside surface of the housing and the exterior surface of the shaft.

Figure 8:
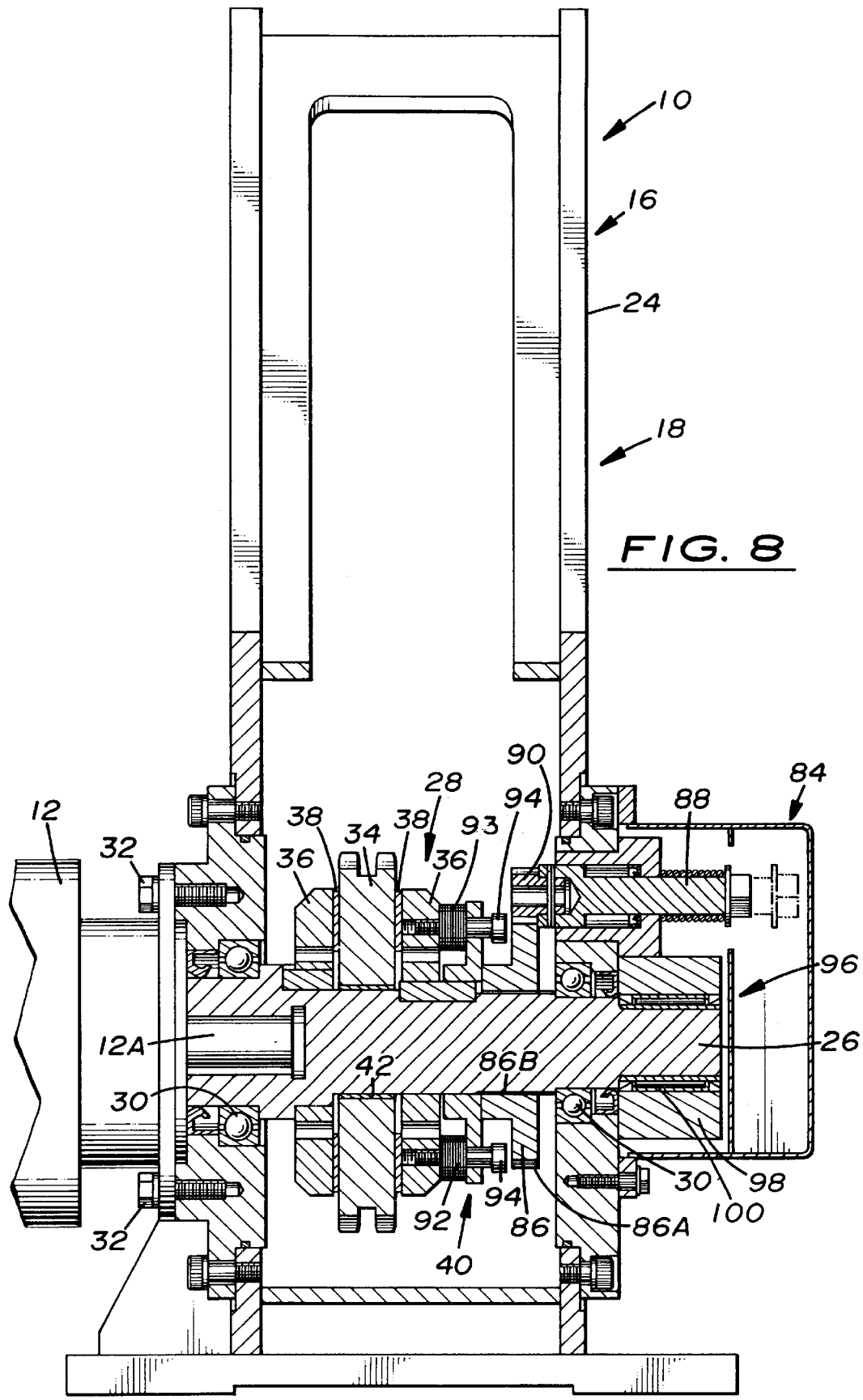
FIG. 8 is an axial sectional view similar to that of FIG. 5, but showing a second embodiment of the components of the slip clutch of the present invention.

Referring to FIGS. 5 and 8, there are shown two alternative embodiments of the slip clutch 28 that are provided within the scope of the present invention. FIG. 5 shows a first embodiment of some of the components comprising the slip clutch 28 wherein a single drive plate 36, a single friction disc element 38 and a single stack of conical disc springs 92 are employed. FIG. 8 shows a second embodiment of some of the components making up the slip clutch 28 wherein a pair of drive plates 36, a pair of the friction disc elements 38 and a plurality of stacks of conical disc springs 93 are employed. The latter stacks are distributed on at least three equally-spaced shoulder bolts 94 around the input drive shaft 26.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

What is claimed is:

1. A torque limiting slip clutch apparatus for a cable reel drive assembly, said apparatus comprising:

(a) an elongated drive shaft mounted to undergo rotational movement;

(b) an annular rotary drive member mounted about said drive shaft to undergo rotational movement relative to said drive shaft and translational movement along said drive shaft;

(c) an annular drive plate fixed mounted about said drive shaft adjacent to said rotary drive member to undergo rotational movement with said drive shaft and relative to said rotary drive member;

(d) means mounted between and engagable with said rotary drive member and drive plate for generating friction therebetween that causes rotational movement of rotary drive member with said drive plate and drive shaft in response to translational movement of said rotary drive member along said drive shaft toward said drive plate;

(e) means mounted along said drive shaft adjacent to a side of said rotary drive member opposite from said drive plate for generating a biasing force against said rotary drive member to cause translational movement of said rotary drive member along said drive shaft toward said drive plate and generation of friction between said rotary drive member and drive plate; and (f) a torque adjustment mechanism disposed adjacent to said biasing force generating means and being operable to adjust the size of the biasing force generated by said biasing force generating means, said torque adjustment mechanism including (i) an adjustment nut having a periphery with external gear teeth and being mounted about said input drive shaft adjacent to said biasing force generating means to undergo translational movement toward and away therefrom, and (ii) a shaft having a pinion gear at one end and being mounted to undergo reciprocal movement toward and away from said periphery of said adjustment nut so as to move said pinion gear into and out of a meshed driving relationship with said gear teeth on said periphery of said adjustment nut such that when said pinion gear is meshed with said external gear teeth on said adjustment nut rotation of said shaft and said pinion gear therewith causes, depending on the direction of rotation, rotation and translation of said adjustment nut relative to said input drive shaft toward or away from said biasing force generating means so as to correspondingly increase or decrease the biasing force generated on said rotary drive member.

2. The apparatus as recited in claim 1, wherein said friction generating means includes a disc element having a friction generating material affixed thereon and being attached to a side of said drive plate facing said rotary drive member.

3. The apparatus as recited in claim 1, wherein said biasing force generating means includes a single stack of conical disc springs.

4. The apparatus as recited in claim 1, wherein said biasing force generating means includes a plurality of stacks of conical disc springs mounted in equally-distant spaced relationship from one another about said input drive shaft.

* * * * *